(12) United States Patent  (10) Patent No.: US 8,594,381 B2
Fedorovskaya et al.  (45) Date of Patent: Nov. 26, 2013

(54) METHOD OF IDENTIFYING MOTION SICKNESS

(75) Inventors: Elena A. Fedorovskaya, Pittsford, NY (US); Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 332 days.

(21) Appl. No.: 12/947,986

(22) Filed: Nov. 17, 2010

(65) Prior Publication Data

US 2012/0121138 A1    May 17, 2012

(51) Int. Cl.
 *G06K 9/00* (2006.01)
(52) U.S. Cl.
 USPC ......................................................... 382/107
(58) Field of Classification Search
 None
 See application file for complete search history.

(56) References Cited

U.S. PATENT DOCUMENTS

| | | | |
|---|---|---|---|
| 5,621,424 A * | 4/1997 | Shimada et al. .................. 345/8 |
| 6,417,969 B1 * | 7/2002 | DeLuca et al. ................ 359/630 |
| 6,497,649 B2 * | 12/2002 | Parker et al. ..................... 600/27 |
| 6,829,095 B2 | 12/2004 | Amitai |
| 7,128,705 B2 | 10/2006 | Brendley |
| 7,710,655 B2 | 5/2010 | Freeman et al. |
| 7,717,841 B2 * | 5/2010 | Brendley et al. ................ 600/27 |
| 2002/0044152 A1 * | 4/2002 | Abbott et al. ................... 345/629 |
| 2003/0073922 A1 * | 4/2003 | Miller et al. .................... 600/545 |
| 2007/0237491 A1 | 10/2007 | Kraft |
| 2009/0179987 A1 * | 7/2009 | Kim ................................ 348/142 |
| 2010/0013739 A1 * | 1/2010 | Sako et al. ......................... 345/8 |
| 2011/0109720 A1 * | 5/2011 | Smolic et al. ................... 348/43 |
| 2012/0250152 A1 * | 10/2012 | Larson et al. .................. 359/464 |

\* cited by examiner

*Primary Examiner* — Nancy Bitar
(74) *Attorney, Agent, or Firm* — Raymond L. Owens

(57) ABSTRACT

A method of identifying a motion-sickness problem in a motion-image sequence includes using a processor to analyze the image-sequence information to identify a propensity that the image sequence can induce motion sickness in a user and forming a saliency map calculated from salient static and dynamic visual features in the image-sequence information. The method further includes identifying moving and static objects and parameters in the saliency map describing the characteristics of the moving and static objects and distribution of salient features that can induce motion sickness in the identified image-sequence information, determining the propensity of the identified moving and static objects and parameters in the saliency map that can induce motion sickness, and producing a signal based upon the determined propensity to identify a motion-sickness problem in the image sequence.

15 Claims, 11 Drawing Sheets

METHOD OF IDENTIFYING MOTION SICKNESS

CROSS REFERENCE TO RELATED APPLICATIONS

Reference is made to commonly assigned U.S. patent application Ser. No. 12/862,978 filed Aug. 25, 2010, entitled "Head-Mounted Display Control by John N. Border et al; U.S. patent application Ser. No. 12/862,994 filed Aug. 25, 2010, entitled Switchable Head-mounted Display, by John N. Border et al, and U.S. patent application Ser. No. 12/913,808, filed Oct. 28, 2010, entitled Head-Mounted Display Control With Image Content Analysis, by Elena A. Fedorovskaya, et al, the disclosures of which are all incorporated herein.

FIELD OF THE INVENTION

The present invention relates to identifying a motion-sickness problem in a motion-image sequence. More particularly, the present invention relates to a control method for reducing motion sickness when using such a display in response to image content displayed on a head-mounted display.

BACKGROUND OF THE INVENTION

Head-mounted displays are widely used in gaming and training applications. Such head-mounted displays typically use electronically controlled displays mounted on a pair of glasses or a helmet with supporting structures such as ear, neck, or head pieces that are worn on a user's head. Displays are built into the glasses together with suitable optics to present electronic imagery to a user's eyes.

Most head-mounted displays provide an immersive effect in which scenes from the real world are obscured and the user can see, or is intended to see, only the imagery presented by the displays. In the present application, immersive displays are considered to be those displays that are intended to obscure a user's view of the real world to present information to the user from the display. Immersive displays can include cameras to capture images of the scene in front of the user so that this image information can be combined with other images to provide a combined image of the scene where portions of the scene image have been replaced to create a virtual image of the scene. In such an arrangement, the display area is opaque. Such displays are commercially available, for example from Vuzix.

United States Patent Application 2007/0237491 presents a head-mounted display that can be changed between an opaque mode where image information is presented and a see-through mode where the image information is not presented and the display is transparent. This mode change is accomplished by a manual switch that is operated by the user's hand or a face-muscle motion. This head-mounted display is either opaque or fully transparent.

Figure 10:
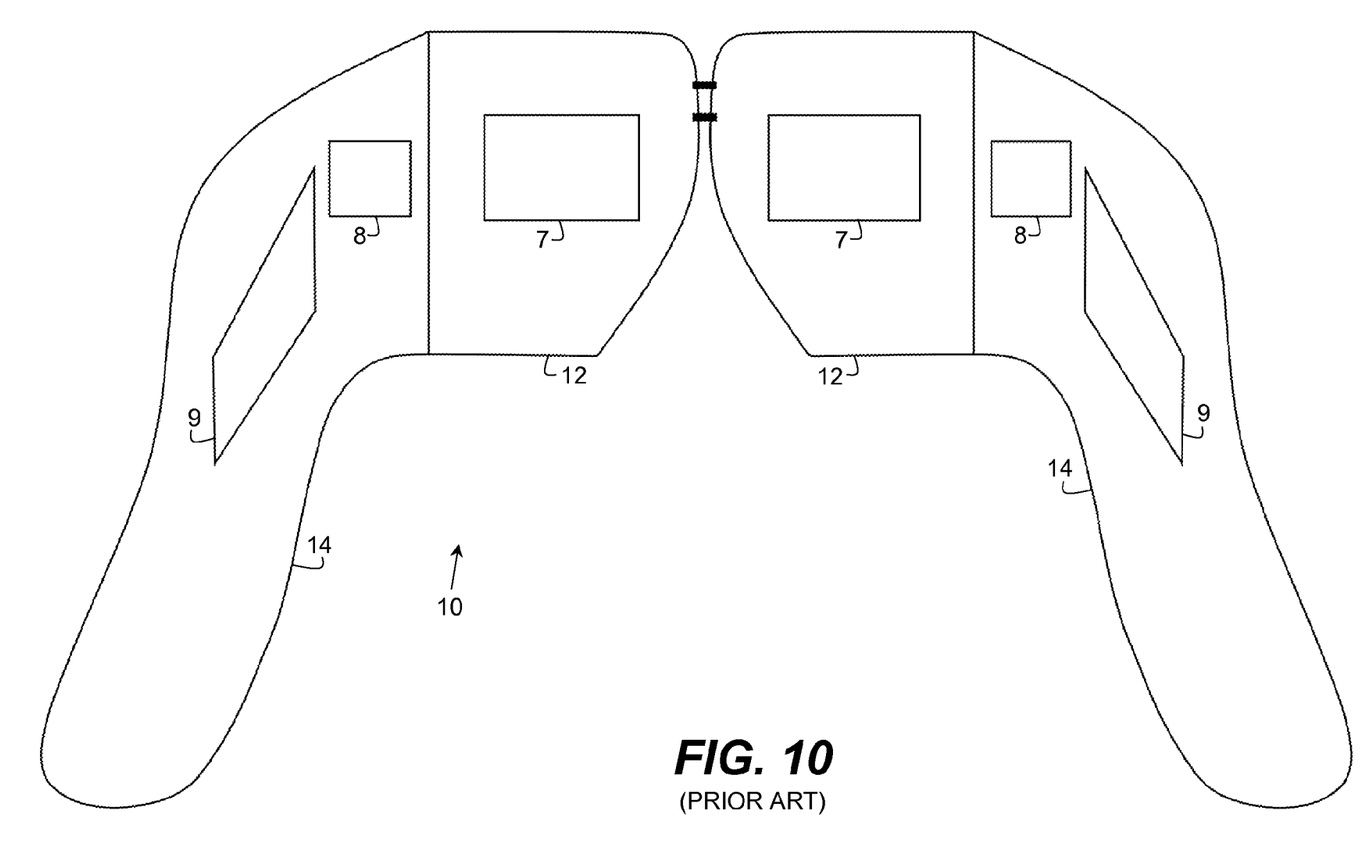
FIG. 10 is an illustration of a prior-art heads-up display with a variable occlusion member in a transparent state.

Head-mounted displays can provide a see-through display for an augmented-reality view in which real-world scenes are visible to a user but additional image information is overlaid on the real-world scenes. Such an augmented-reality view is provided by helmet mounted displays found in military applications and by heads-up displays (HUDs) in the windshields of automobiles or aircraft. In this case, the display area is transparent. FIG. 10 shows a typical prior-art head-mounted display that is a see-through head-mounted display apparatus 10 in a glasses format. The head-mounted display apparatus 10 includes: ear pieces 14 to locate the device on the user's head; lens areas 12 that have variable occlusion members 7; microprojectors 8 and control electronics 9 to provide image information to at least the variable occlusion members 7.

Figure 11A:
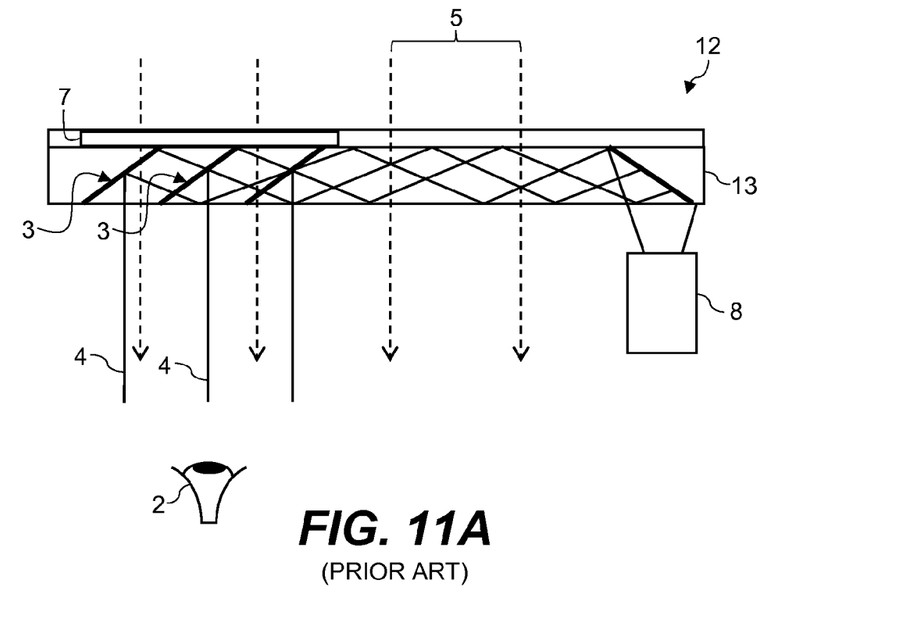
FIG. 11A is a schematic of a cross-section of a prior-art lens area of the heads-up display and the associated light from the microprojector and from the ambient environment with a variable occlusion member in a transparent state.

U.S. Pat. No. 6,829,095 describes a device with a see-through head-mounted display apparatus 10 or augmented-reality display in a glasses format where image information is presented within the lens areas 12 of the glasses. The lens areas 12 of the glasses in this patent include waveguides to carry the image information to be displayed from an image source, with a built-in array of partially reflective surfaces to reflect the information out of the waveguide in the direction of the user's eyes. FIG. 11A shows a cross-section of a lens area 12 including: a waveguide 13; partial reflectors 3 along with; a microprojector 8 to supply a digital image; light rays 4 passing from the microprojector 8, through the waveguide 13, partially reflecting off the partial reflectors 3 and continuing on to the user's eye 2. As seen in FIG. 11A, light rays 5 from the ambient environment pass through the waveguide 13 and partial reflectors 3 as well as the transparent surrounding area of the lens area 12 to combine with the light 4 from the microprojector 8 and continue on to the user's eye 2 to form a combined image. The combined image in the area of the partial reflectors 3 is extra bright because light is received by the user's eye 2 from both the microprojector 8 and light rays 5 from the ambient environment.

Figure 11B:
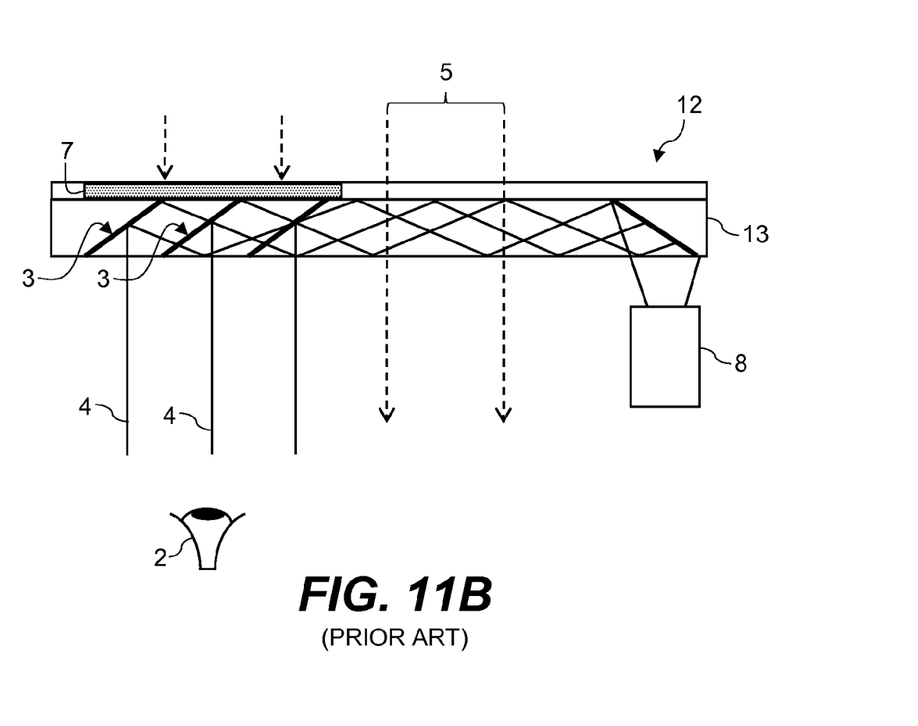
FIG. 11B is a schematic of a cross-section of a prior-art lens area of the heads-up display and the associated light from the microprojector and from the ambient environment with a variable occlusion member in a darkened state.
Figure 12:
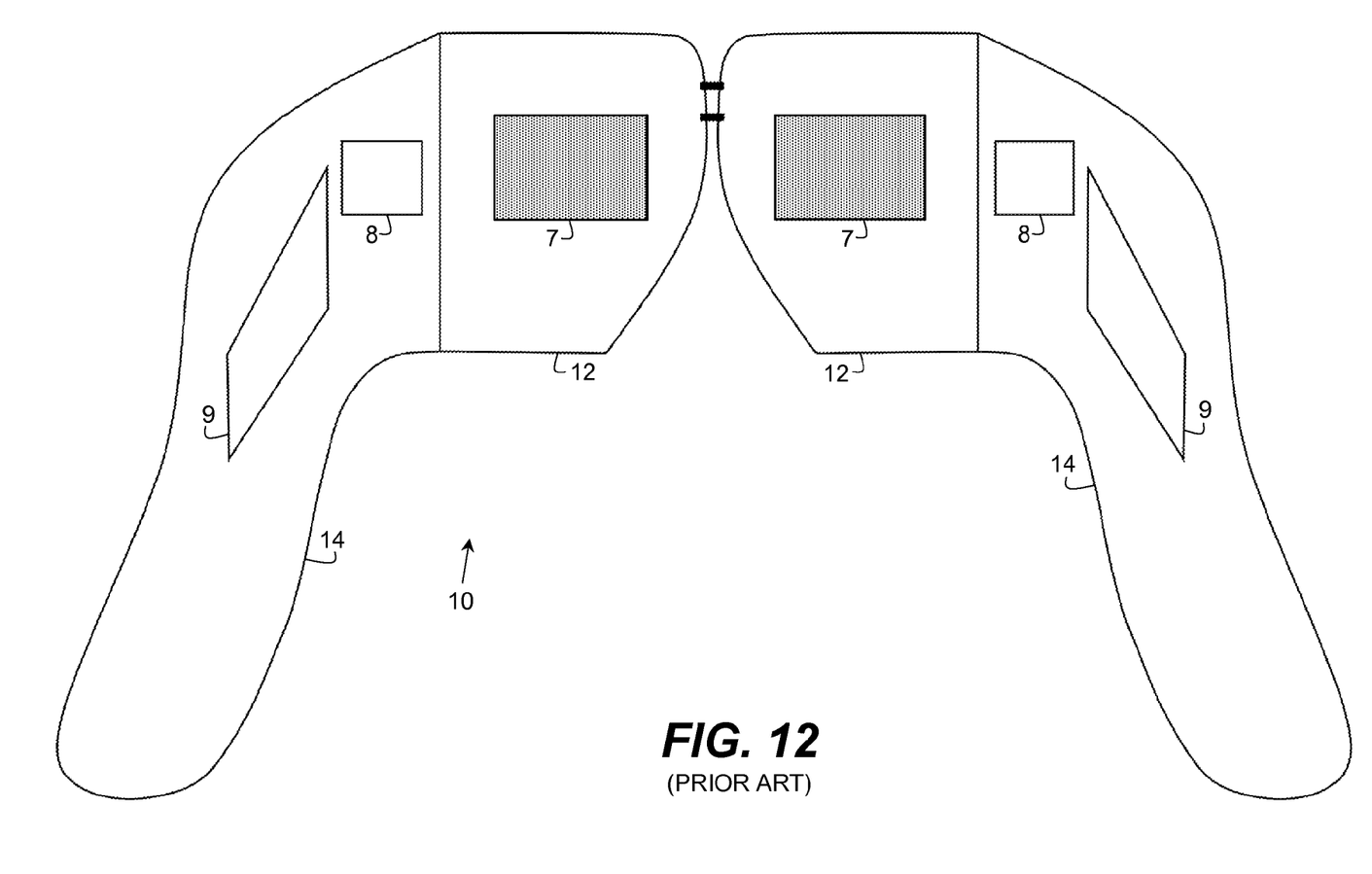
FIG. 12 is an illustration of a prior-art heads-up display with a variable occlusion member in a darkened state.

U.S. Pat. No. 7,710,655 describes a variable occlusion member that is attached to a see-through display as a layer in an area in which image information is presented by the display. The layer of the variable occlusion member is used to limit the ambient light that passes through the see-through display from the external environment. The variable occlusion layer is adjusted from dark to light in response to the brightness of the ambient environment to maintain desirable viewing conditions. FIG. 10 shows a variable occlusion member 7 located in the center of the lens area 12 wherein the variable occlusion member 7 is in a transparent state so that scene light can pass through the variable occlusion member 7 to a viewer's eyes. FIG. 11A shows a variable occlusion member 7, wherein the variable occlusion member 7 is in a transparent state. In contrast, FIG. 11B shows a cross-section of a variable occlusion member 7 in relation to the waveguide 13 and the partial reflectors 3 wherein the variable occlusion member 7 is in a darkened state so that light rays 5 from the ambient environment are substantially blocked in the area of the variable occlusion member 7 and light rays 5 from the ambient environment only pass through the transparent surrounding area of lens area 12 to continue on the user's eye 2. As a result, the combined image seen by the user is not overly bright in the area of the variable occlusion member 7 because substantially only light rays 4 passing from the microprojector 8 is seen in that area. FIG. 12 illustrates the variable occlusion member 7 in a dark state. Although image quality is improved by the method of U.S. Pat. No. 7,710,655, further improvements are needed to address motion sickness.

Motion sickness is a significant obstacle for users of immersive and virtual reality systems and head-mounted displays, limiting their widespread adoption despite their advantages in a range of applications in gaming and entertainment, military, education, medical therapy and augmented reality. Motion sickness or simulator sickness is a known problem for immersive displays because the user cannot see the environment well. As a result, motion on the part of a user, for example head motion, does not correspond to motion on the part of the display or imagery presented to the user by the display. This is particularly true for displayed video sequences that incorporate images of moving scenes that do not correspond to a user's physical motion. Motion-sickness symptoms are known to occur in users wearing head-mounted displays during head or body motion, as well as when watching content or playing computer games for a relatively prolonged period even without head or body motion.

"Motion sickness" is the general term describing a group of common symptoms such as nausea, vomiting, dizziness, vertigo, disorientation, sweating, fatigue, ataxia, fullness of stomach, pallor. Although sea-, car-, and airsickness are the most commonly experienced examples, these symptoms were discovered in other situations such as watching movies, video, in flight simulators, or in space. There are presently several conflicting theories trying to explain motion sickness and its variants. Three main theories are summarized below.

First, sensory conflict theory explains motion sickness symptoms as appearing when people are exposed to conditions of exogenous (non-volitional) motion and sensory rearrangement, when the rules which define the normal relationships between body movements and the resulting neural inflow to the central nervous system have been systematically changed. When the central nervous system receives sensory information concerning the orientation and movement of the body which is unexpected or unfamiliar in the context of motor intentions and previous sensory-motor experience and this condition persists for a relatively long time, motion sickness typically results. In the case of flight simulators and wide-screen movie theaters that create immersive visual experience, visual cues to motion are not matched by the usual pattern of vestibular and proprioceptive cues to body acceleration, which leads to motion sickness. Previous sensory motor experience also plays a role in the severity of the effects. Sensory conflict results from a mismatch between actual and anticipated sensory signals. In each specific experiential situation, different sensory signals can play a role and therefore different mitigation strategies are proposed, though vestibular, motor and visual systems are being recognized among the main sources for the sensory conflict.

Second, the poison theory attempts to explain motion-sickness phenomena from an evolutionary standpoint. It suggests that the ingestion of poison causes physiological effects involving the coordination of the visual, vestibular and other sensory input systems. They act as an early-warning system, which enhances survival by removing the contents of the stomach. Stimulation that is occurring in virtual and other environments, consequently associated with motion sickness provokes reaction of the visual and vestibular systems in such a way that it is misinterpreted by the body as resulting from the ingestion of some type of toxic substance and therefore causes motion sickness symptoms.

Third, the postural instability theory is based on the supposition that one of the primary behavioral goals in humans is to maintain postural stability in the environment, which is defined as the state with reduced uncontrolled movements of perception and action systems. This postural stability depends on the surrounding environment. If the environment changes abruptly or significantly, postural control will be lost or diminished, especially if a person's experience with such an environment is limited or lacking. In such a case, the person will be in a state of postural instability till the control strategy is learned and postural stability attained. Therefore, the postural instability theory states that the cause of motion sickness lies in prolonged postural instability, wherein the severity of the symptoms increases with the duration of the instability. A number of environmental situations can induce long periods of postural instability: low frequency vibration; weightlessness; changing relationships between the gravito-inertial force vector and the surface of support; and altered specificity, the factor that is relevant to motion sickness and other conditions when there is no obvious body motion. In these cases, visual characteristics (for example, visual scene motion, optical flow, or accelerations,) are unrelated to the constraints on control of body, therefore postural control strategies for gaining postural stability will not work. For example, a subject can use muscular force or even subtle movements to respond to visually perceived situations that do not correspond to the real physical environment, evoking thus a deviation from a stable position and causing postural instability. Other theories suggest eye movements or multi-factor explanations of motion sickness.

Motion sickness that occurs in the absence of body or head motion are of special interest and importance since head-mounted displays are becoming wide-spread for gaming applications, virtual-reality systems, and as personal viewing devices. Military flight simulators users develop signs and symptoms normally associated with classic motion sickness, such as nausea, pallor, sweating, or disorientation. In these cases, users have a compelling sense of self motion through moving visual imagery. This phenomenon has been referred to as "visually-induced motion sickness" to underscore its dependence on the visual stimulation in contrast to other symptoms collectively referred to as "asthenopia" and expressed as eyestrain, headache and blurred vision. Motion sickness depends at least in part on properties of visual stimulation. Visual scene motion and scene kinematics roughly corresponding to roll, pitch and flow present in the visual imagery correlates with sickness symptoms of nausea, disorientation and oculo-motor discomfort.

Visually induced motion sickness has been associated with the characteristics of visually presented content that are related to moving scenes, objects, optical flow, and other parameters indicating motion. It has also been reported that immersive environments with their large field-of-view displays, although enhancing a feeling of presence, can aggravate the symptoms. Summarily, these findings emphasize motion signals present in the scene as the factor behind the adverse effects. Such stimuli can elicit specific eye movement related reactions, namely, optokinetic nystagmus and the vestibulo-ocular reflex, which serve to provide image stabilization on the retina while observers maintain target fixation The illusion of self motion, referred to as vection, can lead to disorientation, one of the symptoms of motion sickness and has been cited as a key indicator of sickness symptoms in simulators and VR systems. In addition to low-level visual features influencing self-motion perception in virtual-reality systems, high-level cognitive factors have been shown to increase the illusion. The high degree of naturalism of the large distant visual surroundings in immersive environments that signifies "global scene consistency", that is the coherence of a scene layout with our natural environment, led to the increased likelihood of inducing vection.

Other modalities such as moving sounds which match visually presented landmarks were shown to enhance vection in virtual reality. Similarly, adding slight vibrations like the ones resulting from actual chair rotation increased the frequency and intensity of vection in auditory self motion simulation. The effects of physical (haptic) stimuli to improve spatial orientation and reduce postural instability and vection have been a subject of research. Other signal modalities can also be envisioned to help counteract adverse symptoms, such as, for example, a thermal signal generating a sensation of warmth.

Several methods calculate parameters of moving objects and scenes to quantify aspects of visual imagery that can lead to motion-sickness-like symptoms. However, these tend to emphasize presence of motion in the scenery and derive measures of such motion. It is therefore difficult using such measures to predict whether images that do not have explicit motion signals will lead to motion sickness symptoms. Additionally, such measures do not take into consideration other visual signal modalities such as contrast, color (hue, saturation), luminance, depth, orientation which can increase adverse motion sickness related effects.

Despite voluminous research on motion sickness and related conditions, a solution to the problem has not yet been found, though several strategies have been suggested in the prior art to reduce the problem. For example, an invention disclosed in U.S. Pat. No. 6,497,649 by Parker et al describes a method for displaying an independent visual background including visual cues that are matched to the perception of motion by the vestibular system. The motion perceived by the vestibular system is detected by electromechanical sensors, the output of which is transformed through a perceptual model to produce perceptually relevant signals. The independent visual background is based upon these signals and is used to alleviate motion, simulator and virtual environment sickness. The method was designed primarily for the users of virtual reality and immersive systems and was shown to help when presented in the center of the visual field which essentially disrupts a viewing experience in a rather unnatural way. Similarly limited to a specific condition is an invention described in U.S. Pat. No. 7,128,705 by Brendley et al. disclosing a motion-coupled visual environment for the prevention or reduction of motion and simulator sickness to address the problems encountered by a user on a moving platform. The invention operates by sensing and signaling the inertial movement of the platform, displaying a window for the user to focus on, and moving the window in a way that correlates the perceived motion with the sensed inertial motion.

U.S. Pat. No. 6,497,649 discloses a method for reducing motion sickness produced by head movements when viewing a head-mounted immersive display. The patent describes the presentation of a texture field surrounding the displayed image information, wherein the texture field is moved in response to head movements of the user. This patent is directed at immersive displays.

The detrimental impact of motion sickness symptoms on the user and existing limitations of solutions on one hand, and desirability and potential utility of head-worn displays on the other hand, underscore the need to develop better methods to alleviate motion-sicknesses that take into consideration content information and subjects' characteristics and which can operate even when no subject motion is expected.

Motion sickness is less of an issue for augmented-reality displays since the user can see the environment better, however, the imaging experience is not suitable for viewing high-quality images such as movies with a see-through display due to competing image information from the external scene and a resulting degradation in contrast and general image quality.

There is a need, therefore, for an improved head-mounted display that enables viewing of high-quality image information with reduced motion sickness and improved viewing comfort for the user.

SUMMARY OF THE INVENTION

In accordance with the present invention, there is provided a method of identifying a motion-sickness problem in a motion-image sequence, comprising:

using a processor to analyze the image-sequence information to identify a propensity that the image-sequence can induce motion sickness in a user and forming a saliency map calculated from salient static and dynamic visual features in the image sequence information;

identifying moving and static objects and parameters in the saliency map describing the characteristics of the moving and static objects and distribution of salient features that can induce motion sickness in the identified image-sequence information;

determining the propensity of the identified moving and static objects and parameters in the saliency map that can induce motion sickness; and producing a signal based upon the determined propensity to identify a motion-sickness problem in the -image sequence.

The present invention provides reduced motion sickness and improved viewing comfort for the viewer of a motion-image sequence.

BRIEF DESCRIPTION OF THE DRAWINGS

The above and other objects, features, and advantages of the present invention will become more apparent when taken in conjunction with the following description and drawings, wherein identical reference numerals have been used, where possible, to designate identical features that are common to the figures, and wherein.

Because the various layers and elements in the drawings have greatly different sizes, the drawings are not to scale.

DETAILED DESCRIPTION OF THE INVENTION

A wide variety of head-mounted displays are known in the art. The head-mounted displays include a microprojector or image scanner to provide image information, relay optics to focus and transport the light of the image information to the display device and a display device that is viewable by the user's eyes. Head-mounted displays can provide image information to one eye of the user or both eyes of the user. Head-mounted displays that present image information to both eyes of the user can have one or two microprojectors. Monoscopic viewing in which the same image information is presented to both eyes is done with head-mounted displays that have one or two microprojectors. Stereoscopic viewing typically requires a head-mounted display that has two microprojectors.

The microprojectors include image sources to provide the image information to the head-mounted display. A variety of image sources are known in the art including, for example, organic light-emitting diode (OLED) displays, liquid crystal displays (LCDs), or liquid crystal on silicon (LCOS) displays.

The relay optics can comprise refractive lenses, reflective lenses, diffractive lenses, holographic lenses or waveguides. For a see-through display the display should permit at least a partial view of the ambient environment or scene outside the head-mounted display within the user's line of sight. Suitable displays known in the art in which a digital image is presented for viewing by a user include a device or surface including waveguides, polarized reflecting surfaces, partially reflecting surfaces, or switchable mirrors. The present invention concerns display devices that are useable as see-through displays and that are useable to present information to a user.

According to an embodiment of the present invention, image-sequence information is presented to a user through a head-mounted display device. The head-mounted display includes a viewing area that is switchable between a transparent viewing state and an information viewing state. The content of the image-sequence information is analyzed to estimate the propensity of the image-sequence information content to induce motion sickness or motion-sickness-related symptoms. Depending on the estimate, the image information is modified or the state of at least a portion of the switchable viewing area is modified.

More particularly, according to a method of the present invention, a method of identifying a motion-sickness problem in an image sequence includes using a processor to analyze the image-sequence information to identify a propensity that the image-sequence can induce motion sickness in a user and forming a saliency map calculated from salient static and dynamic visual features in the image sequence information, identifying moving and static objects and parameters in the saliency map describing the characteristics of the moving and static objects and distribution of salient features that can induce motion sickness in the identified image-sequence information. The propensity of the identified moving and static objects and parameters in the saliency map that can induce motion sickness is determined. A signal based upon the determined propensity to identify a motion-sickness problem in the motion-image sequence is produced. The present invention enables an estimate of the probability that imagery, including static scenes that do not contain moving elements, have a tendency to produce motion sickness effects. The same processor is used for all the steps of the method or separate processors are used for different steps.

The image-sequence information can include motion image sequences or sequences of still images. The propensity is determined, for example, from the velocity, acceleration, direction, duration of motion, or optical flow in the identified image-sequence information. The propensity can also be determined from the moving and static objects from the saliency map.

Figure 1:
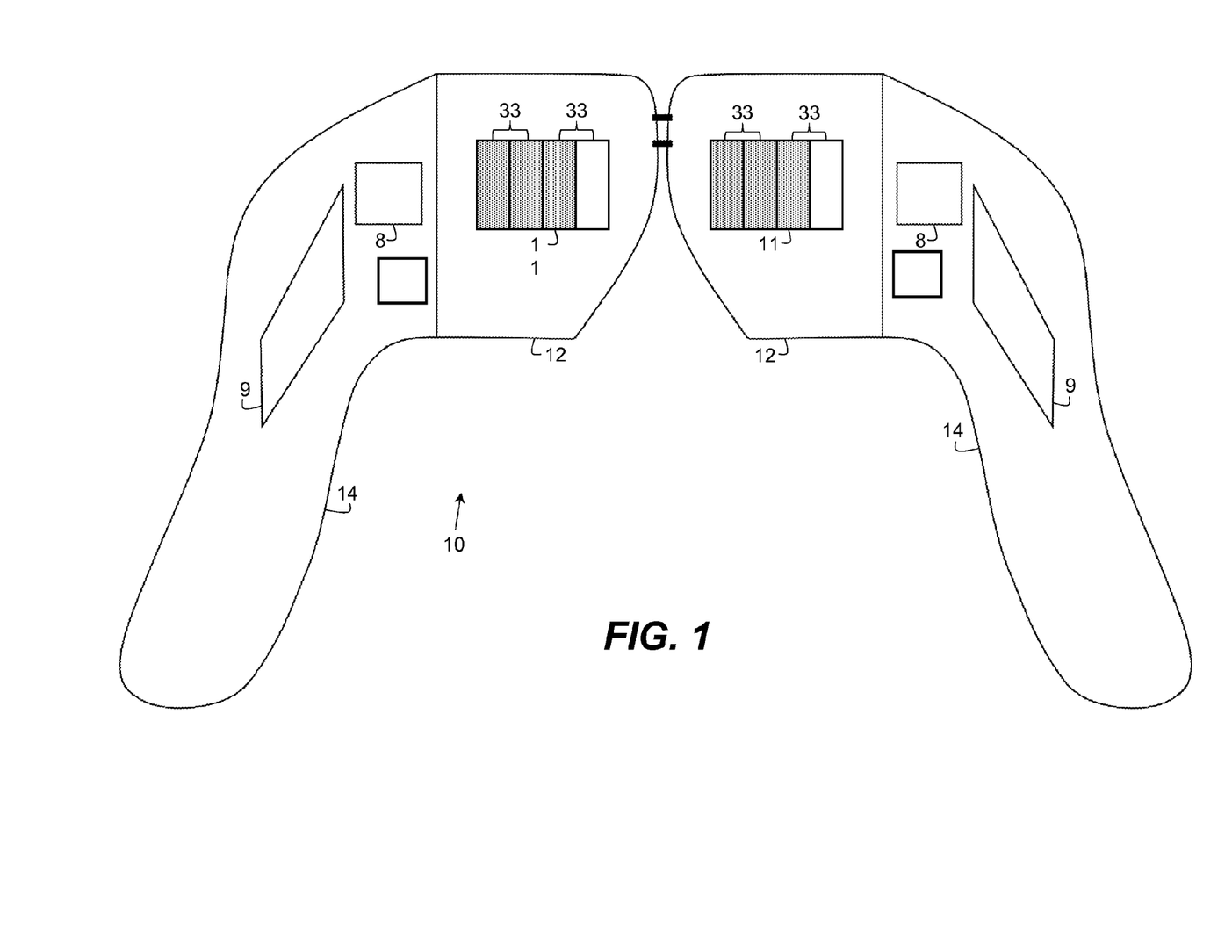
FIG. 1 is an illustration of a heads-up display useful in an embodiment of the present invention.
Figure 2A:
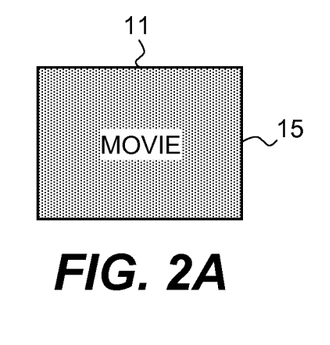
FIGS. 2A-2F are sequential illustrations of a switchable viewing area with portions reduced in size for displaying information according to an embodiment of the present invention.
Figure 2B:
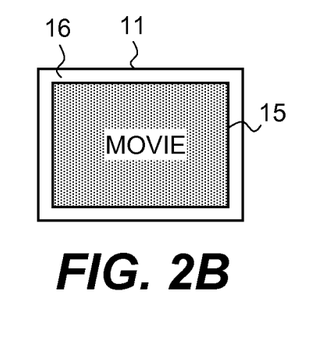
Figure 2C:
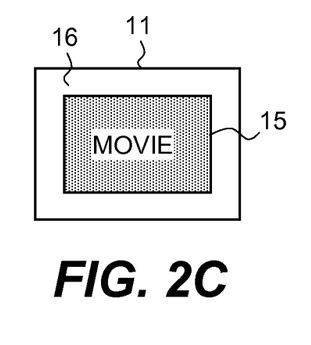
Figure 2D:
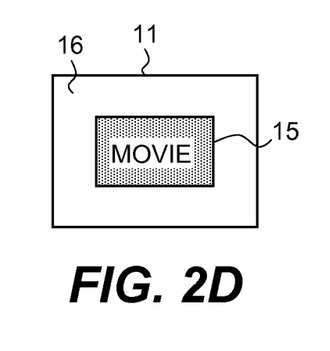
Figure 2E:
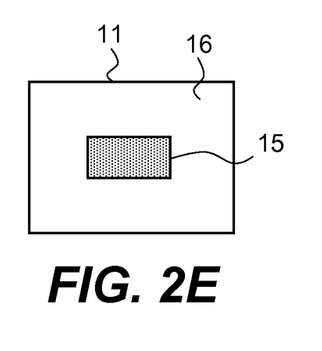
Figure 2F:
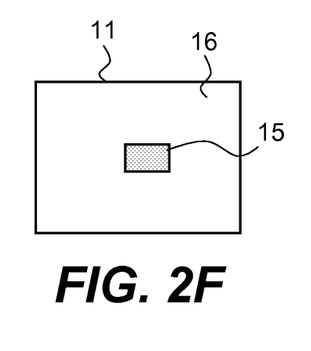
Figure 3A:
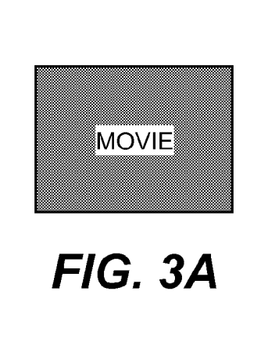
FIGS. 3A-3E are sequential illustrations of a switchable viewing area with displayed information having relative contrast changes according to an embodiment of the present invention.
Figure 3B:
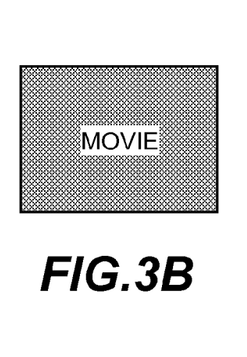
Figure 3C:
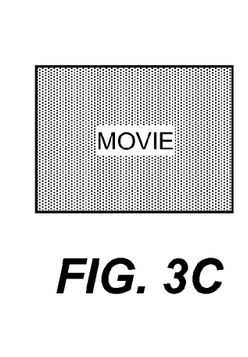
Figure 3D:
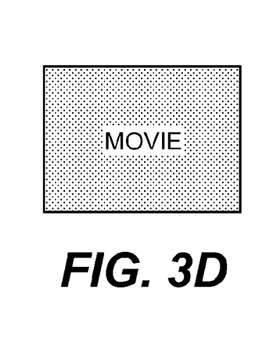
Figure 3E:
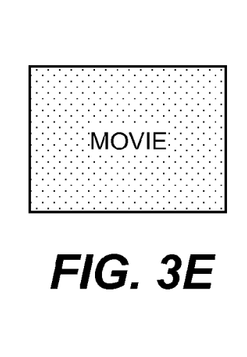
Figure 9:
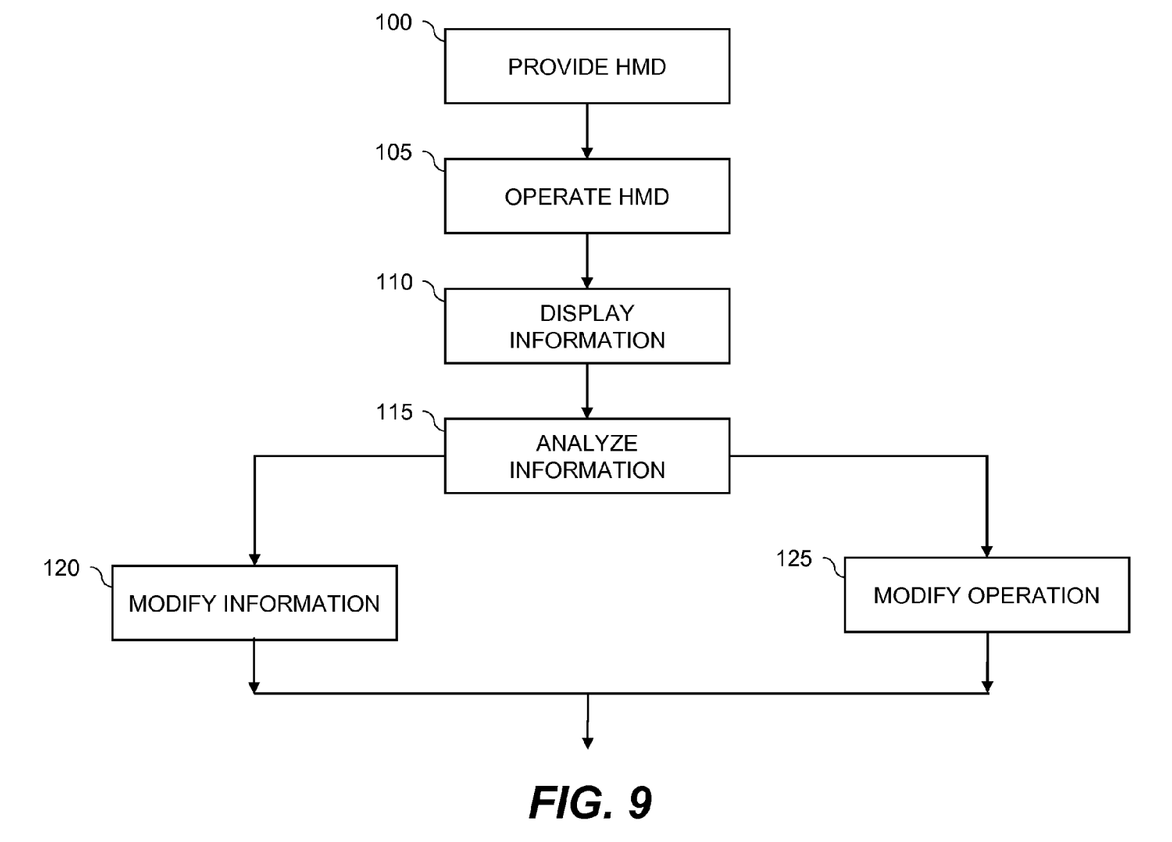
FIG. 9 is a flow graph illustrating a method of an embodiment of the present invention.

As illustrated in FIGS. 1 and 9 according to an embodiment of the present invention, a head-mounted display 10 is provided in step 100 that includes lens areas 12 with a switchable viewing area 11 that is switched between a transparent viewing state and an information viewing state. The transparent viewing state is transparent so that a user of the head-mounted display 10 views at least a portion of the scene outside the head-mounted display 10 in the user's line of sight. The information viewing state is opaque and the user views information displayed in the switchable viewing area 11. The head-mounted display 10 is operated in step 105 in the information viewing state to display image-sequence information in step 110. Head-mounted display 10 includes an image source or microprojector 8 and control electronics 9 that are mounted on ear pieces 14 or in other locations of the head-mounted display 10. The image-sequence information is analyzed in step 115 to produce a signal estimating the propensity of the image-sequence information to induce motion sickness or symptoms of motion sickness in the user. The image-sequence information or the state of at least a portion of the switchable viewing area 11 is modified in response to the signal to reduce the propensity of the image-sequence information to induce motion sickness or symptoms of motion sickness in the user in steps 120 and 125, respectively. The user can then operate the head-mounted display and view the image-sequence information with greater comfort for longer periods of time.

In various embodiments of the present invention, the image-sequence analysis can include a variety of image-processing operations. In one embodiment, the analysis includes forming a saliency map calculated from salient static and dynamic visual features in the image sequence information. The analysis can include identifying moving and static objects in the saliency map of the image-sequence information. In another embodiment, the analysis includes determining parameters of moving and static objects in the image-sequence information. In a further embodiment, the analysis includes identifying the propensity by determining the velocity, acceleration, direction, duration of motion, range of motion, or optical flow in the identified image-sequence information. In yet another embodiment, the analysis includes computing the propensity of the identified image-sequence information to provide the illusion of self-motion in a user. Algorithms are known in the prior art for calculating these image-sequence attributes using software executing on a computer, for example an embedded computer having a central processing unit, memory, software, and input/output capability. Processors known in the art can be used, for example image processors, either programmable or hard-wired, or conventional computers.

While viewing visual imagery, observers apply saccadic eye movements—rapid eye movements that enable fixation of the eye on the object of interest. Saccadic eye movements play a crucial role in selective attention, which permits detailed visual information processing of only a portion of the available visual information contained in the scene, thus preventing information overload. The bottom-up approach to selective attention explains a sequence of eye saccades during scene viewing as driven by the saliency map.

The saliency map is a topographically arranged map that represents visual saliency of a corresponding visual scene. The saliency map integrates normalized information from the individual feature maps into one global measure of conspicuity, where the different visual features contributing to attentive selection of a stimulus represent color, orientation, luminance, movement, depth and other characteristics. The position of the maximum in this map with the highest measure of saliency corresponds to the location in a visual scene for most probable bottom-up attentional selection. After the selection is made, suppression of activity at the selected location (which can correspond to the psychophysically observed "inhibition of return" mechanism) leads to selection of the next location at the location of the second-highest value in the saliency map and a succession of these events generates a sequential scan of the visual scene.

In addition to bottom-up mechanisms represented by the saliency map, top-down influences play an important role in many cases and can override bottom-up saliency. Various mechanisms integrate top-down influences in the saliency map. Although the initial application of the saliency map was to explain control mechanisms for covert attention, in some embodiments it is used to predict overt visual attention in the form of saccadic eye movements The present invention uses determination of the salient features and saliency maps computed for the stationary as well as moving images to evaluate propensity of the scene to evoke motion sickness effects. To compute salient locations in the scene, an algorithm can include information regarding various image features, such as color, luminance, contrast, orientation, depth, motion, their relative strength and location to compute the feature maps and the resulting saliency map. Alternatively, purely bottom-up saliency maps are modified by emphasizing semantically salient objects and their corresponding features through weighting factors, which modify the saliency values of the features and their corresponding locations, such as for example faces and facial features, particularly eyes. Familiarity of the face can also be taken into consideration, such as for example, a face of a person's child, relative or a friend. Similarly, a frequently-shown face of the main character in the video film can draw increased attention compared to other faces in the scene. Likewise, faces with the vivid emotional expressions will be viewed longer, and, thus would have a higher saliency value compared with the neutral faces. Other scene characteristics that affect visual experience include aesthetic response and can also modify calculated saliency. Some of those characteristics include centrality; objects located in the center, vanishing points, relative size, symmetry, convexity can influence gaze trajectory. Further, a number of measures derived based on the salient features and the saliency maps are calculated with respect to the propensity of the scene to evoke motion or motion sickness.

Several measures are computed, such as for example, the attentional scan-path length for salient locations (overall distance between sequential salient locations) identified using the saliency map. Such a path length is expressed for example, in units of visual angle that subtends each pair of sequential salient locations, or in other units, such as pixels. Alternatively, the attentional scan-path length is computed for a selected number of the salient locations, for example, first ten locations. In another embodiment, the number of the locations for the scan-path length calculation is determined based on the intended duration of the visual exposure using the assumption that the attentional scan path corresponds to the gaze scan path (sequence of eye movements, or eye fixation trajectory, when viewing an image). In this case information about an average saccade duration (~30-100 ms) and an average fixation duration (~100-300 ms), or the average saccade speed (300-400°/s), can be used to assess an approximate number of the expected saccades, and thus the number of the salient locations can be estimated as a function of a stimulus presentation time. More precise determinations can also be made based on the existing literature linking the saliency value of the location, saccade velocity and fixation duration. The intrinsic value of visual information affects saccade velocities.

An average distance between pair-wise salient locations, or a number of the location pairs with the distance above a pre-specified threshold can also be computed from the saliency map with the notion that they will approximate an average expected saccade amplitude or a number of the expected saccades with the amplitude above a pre-specified threshold, respectively. Furthermore, a number of salient locations on the periphery of the image with respect to the center, as well as their relative distance can be used as other measures. The measures described above are used one at a time, or in a combination with other saliency based measures or previously described measures of visual motion.

A large number of highly salient locations in an image creates visual clutter, and an unpleasant sensation that can lead to fatigue, which in turn increases the probability of the motion sickness. It will also facilitate an increased rate of head movements, since the eyes and the head move in coordination during viewing and visual orienting. Additionally, large distances and eccentricity of the salient locations would further raise the incidence of the head movements occurring in conjunction with the eye movements performed to fixate corresponding salient locations. These head and eye movements can trigger vestibule-ocular reflex, and can increase the probability of motion sickness in the head mounted displays and immersive systems.

The propensity measures computed as described above on the basis of the saliency map are used to anticipate an appearance of motion sickness symptoms while viewing different types of content by estimating the probability of its occurrence. This is used to modify presentation parameters and reduce delays in updating the viewing area by pre-configuring displayed content in advance should the head motion be detected or estimated motion sickness probability reach a set threshold.

Additionally, the content of the outside environment other than displayed data can be acquired by a digital camera as a part of the head mounted or an immersive system and analyzed with respect to the salient information in a similar way to estimate if it can evoke viewer reaction. In other embodiments, different signal modalities such as acoustic information can be included in the saliency and the propensity for motion sickness computations.

According to embodiments of the present invention, a variety of modifications to the operation of the head-mounted display 10 are effective in reducing user motion sickness. In one embodiment, the modification includes changing presentation parameters of the switchable viewing area as a function of the propensity estimated by the analysis. Presentation parameters include attributes of the switchable viewing area such as relative transparency of portions of the switchable viewing area 11. For example, in an embodiment illustrated in FIGS. 2A-2F, the modification includes reducing the size of the portion in which image-sequence information is displayed in the switchable viewing area. As shown in the sequential series of FIGS. 2A-2F, the portion 15 of the switchable viewing area 11 in the information viewing state is decreased while the portion 16 of the switchable viewing area 11 in the transparent viewing state is increased. In an alternative, the portion 16 remains in the information viewing state but no information is shown, for example as a dark or light field. In another alternative, only still information is shown in the portion 16.

Other embodiments are also included in the present invention. In one embodiment, the modification includes switching the at least a portion of the switchable viewing area 11 from the information viewing state to the transparent viewing state based on the signal. In another embodiment, the modification includes increasing the transparency of the entire switchable viewing area 11 over time. In this embodiment, any information shown in the switchable viewing area 11 is visually combined with a view of the external scene as the transparency of the switchable viewing area 11 increases. This embodiment can be combined, for example, with changes in the size of the portion 15 in FIGS. 2A-2F that is used to show information, so that as the information viewing portion 15 decreases, the portion 16 of the switchable viewing area 11 becomes transparent. The modifications in head-mounted display operation are implemented by electronic circuits that control the head-mounted display 10, as described further below.

According to other embodiments of the present invention, a variety of modifications to the image-sequence information are effective in reducing user motion sickness. In one embodiment, the modification includes increasing the transparency of the image-sequence information displayed in the switchable viewing area. By increasing the transparency is meant that the brightness of the image-sequence information in the head-mounted display 10 is decreased relative to the brightness of an external scene in the user's line of sight, while at least a portion of the head-mounted display 10 is in the transparent state. This is illustrated in sequential FIGS. 3A-3E with background information that changes from a dark background, illustrating a relatively high contrast information viewing state in comparison to the transparent viewing state, to a light background illustrating a relatively low contrast information viewing state in comparison to the transparent viewing state.

In another embodiment, the modification includes decreasing the similitude of the image-sequence information displayed in the switchable viewing area to a real-world scene. According to various embodiments, decreasing the similitude can include changing the sharpness of the image-sequence information, adding noise to or subtracting noise from the image-sequence information, increasing or decreasing the pixelation of the image-sequence information, or changing the brightness, color saturation, or contrast of the image-sequence information. Image-processing circuitry, such as embedded computers executing software can implement modifications to image-sequence information.

Figure 4A:
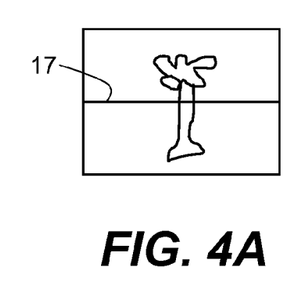
FIG. 4A is a switchable viewing area with an artificial horizon according to an embodiment of the present invention.
Figure 4B:
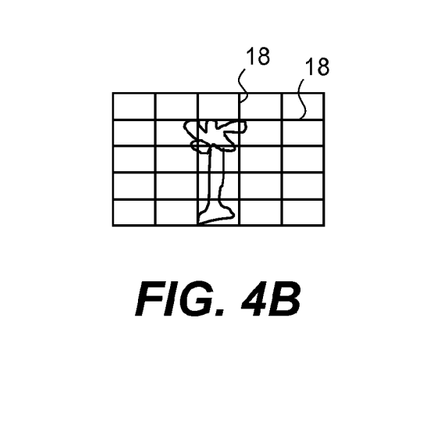
FIG. 4B is a switchable viewing area with a grid according to an embodiment of the present invention.

In yet another embodiment of the present invention, the modification includes adding additional information to the image-sequence information. Referring to FIG. 4A in one embodiment, the additional information is an artificial or actual horizon 17 in the image-sequence information. In another embodiment shown in FIG. 4B, the modification includes providing a fixed grid 18 in the image-sequence information. In yet another embodiment, the modification includes providing a stable audio tone or a steady and localized tactile sensation to the user, for example, light haptic signals applied to a finger tip. Generating such a haptic signal when the user of the head mounted display 10 is viewing motion sickness-prone visual content, can counteract postural changes leading to motion-sickness symptoms. Image-processing circuitry, such as embedded computers executing software, adds information to image-sequence information. Transducers under computer control can provide a stable audio tone or a steady and localized tactile sensation to the user In other embodiments of the present invention, the modification is a function of the user-exposure duration, i.e. the length of time that a user is exposed to or uses the head-mounted display 10. In other embodiments, the modification is responsive to individual preferences and susceptibilities. For example, a user can have user attributes and the modification is a function of the user attributes. The user attributes can include age, gender, race, and individual susceptibility to motion sickness or motion sickness symptoms. Exposure duration is calculated by electronic circuits having a clock that measures time durations from specific events, such as beginning or ending the use of a head-mounted display. The calculated exposure duration is electronically provided to a control circuit or computer to control an image sequence or the operation of the head-mounted display 10. Such electronic circuits or computer control devices are known in the art. User attributes are provided by a user through a computer user interface or taken from a previously stored user attribute database. The user attribute information thus provided is accessed by an electronic circuit or computer controller to control the image-sequence information or operate the head-mounted display. User attributes are known either from a prior experience, rated on the spot and incorporated into a user profile associated with the head-mounted display, measured prior to the first usage, or gradually learned through usage of a particular user.

Figures 5A, 5B:
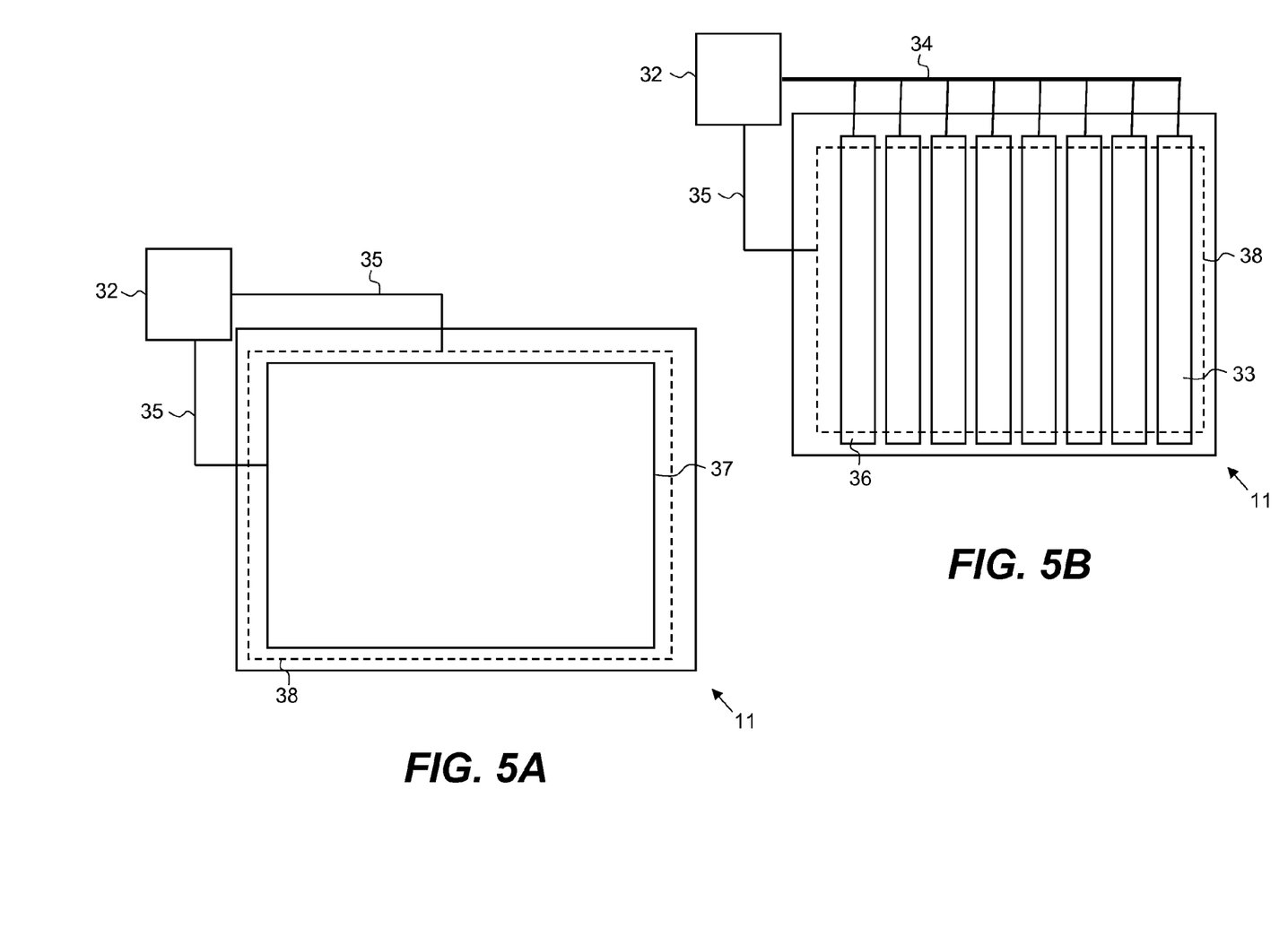
FIG. 5A is a schematic of a switchable viewing area with a single independently controllable region useful in an embodiment of the present invention.
FIG. 5B is a schematic of a switchable viewing area with multiple independently controllable regions forming a one-dimensional array of rectangles useful in an embodiment of the present invention.
Figure 6A:
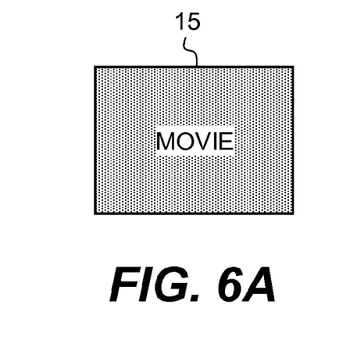
FIGS. 6A-6E are sequential illustrations of a switchable viewing area with displayed information panned across the area useful in an embodiment of the present invention.
Figure 6B:
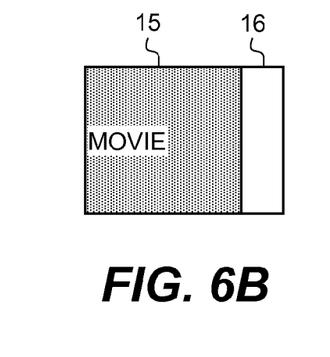
Figure 6C:
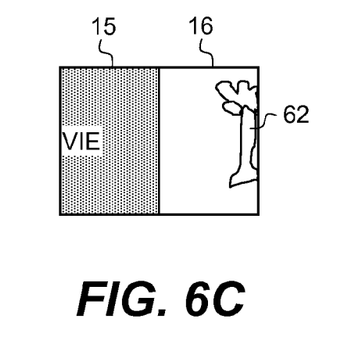
Figure 6D:
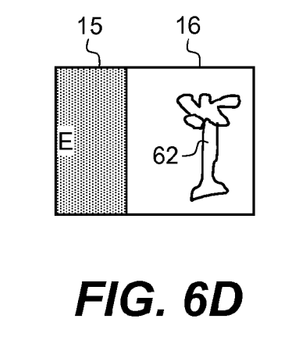
Figure 6E:
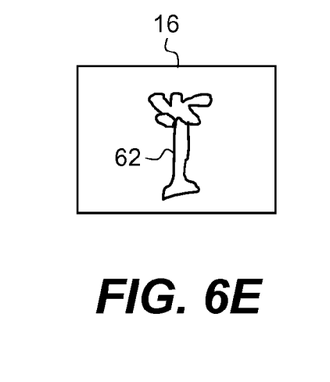

In one embodiment useful in the present invention, the viewing area of the head-mounted display 10 includes a switchable viewing area 11 that is comprised of a single switchable area that is switched from a substantially opaque information state to a substantially transparent state or vice versa. FIG. 5A shows a schematic diagram of a switchable viewing area 11 comprised of a single area that is controlled with a single control signal from the controller 32 by control wires 35 to a transparent electrode 37 and a transparent backplane electrode 38 on the switchable viewing area 11. The transparent electrodes 37 and 38 are separated by an electrically responsive material such as a liquid crystal pi cell layer, a polymer-stabilized liquid-crystal layer, a switchable-reflective-material layer or an electrochromic layer. In various embodiments of the present invention, the lens area 12 (FIG. 1) of the head-mounted display apparatus 10 (FIG. 1) is comprised entirely of the switchable viewing area 11 or alternately the lens area 12 (FIG. 1) is comprised of a first portion that is a switchable area and a second portion that is not switchable and is substantially transparent.

In another embodiment of the invention, the switchable viewing area 11 is comprised of a series of rectangular regions. FIG. 5B shows a schematic diagram of a switchable viewing area 11 that is controlled by a controller 32 (for example, part of control electronics) and connected by a series of wires 34 connected to a series of rectangular transparent electrodes 36 forming rectangular regions 33 arranged across the switchable viewing area 11 and a single backplane transparent electrode 38 connected with control wire 35.

Again, the transparent electrodes 36 and 38 are separated by an electrically responsive material. In this embodiment of the invention, each of the rectangular regions 33 is switched independently (also shown in FIG. 1). Transparent electrodes 36 are shaped in other ways to provide a variety of independently controllable switchable areas.

Figure 7A:
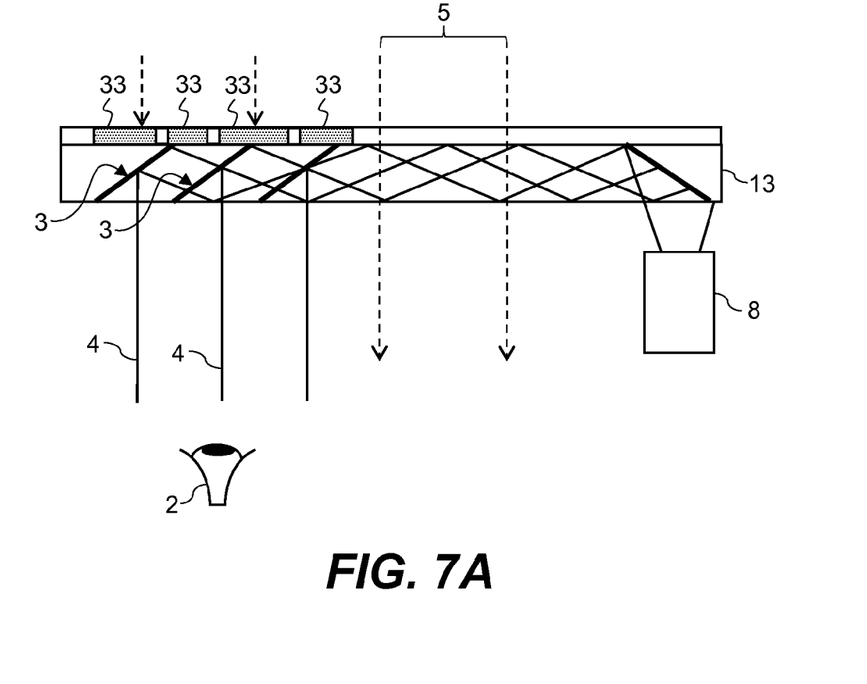
FIG. 7A is a schematic of a cross-section of a lens area of a heads-up display in an embodiment of the invention with multiple regions shown in a darkened state.
Figure 7B:
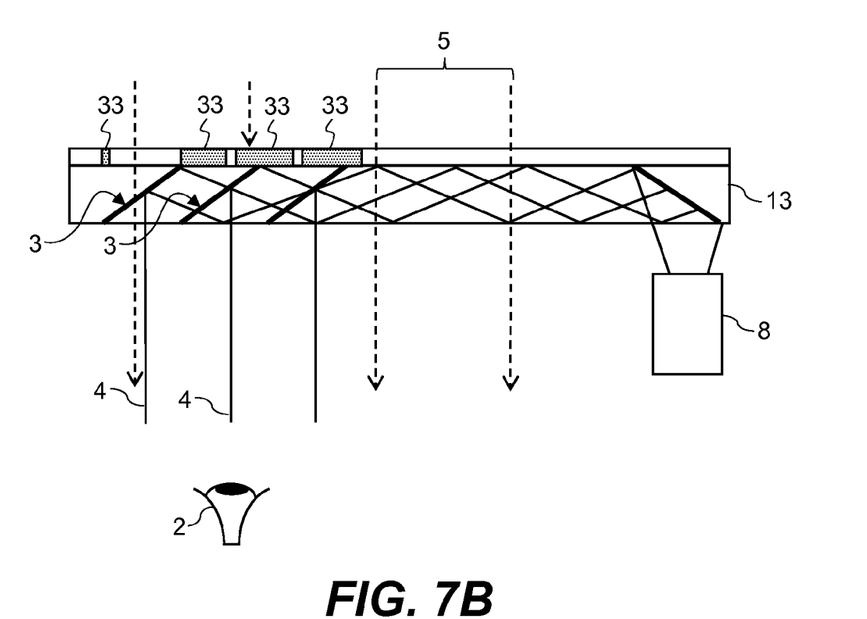
FIG. 7B is a schematic of a cross-section of a lens area of a heads-up display in an embodiment of the invention with multiple regions wherein some of the regions are shown in a transparent state and other regions are shown in a darkened state.

FIGS. 6A to 6E illustrate successive stages of controlling a one-dimensional array of independently controllable rectangular regions (e.g. 33 in FIG. 5B) in a lens area with a controller. In this illustration, spatially adjacent independently controllable switchable viewing areas are successively switched to gradually change the display area from one state to another. In this embodiment, the controller simultaneously controls a portion 16 of the independently controllable switchable viewing area 11 (FIG. 1) to be at least partially transparent so that real-world objects can be seen (e.g. 62) while another portion 15 of the independently controllable switchable viewing area 11 (FIG. 1) is opaque. Furthermore, each of the independently controllable switchable viewing areas is switched at a different time. FIGS. 7A and 7B are cross sections of the lens area with rectangular portions 33 of the switchable viewing areas 11 (FIG. 1) in the light-absorbing (information) state (FIG. 7A) or with one rectangular portion 33 of the switchable viewing area 11 (FIG. 1) in the transmissive (transparent) state (FIG. 7B) so that ambient light rays 5 are either occluded by the rectangular portion 33 of the switchable viewing area 11 or pass through the rectangular portion 33 of the switchable viewing area 11. In either case, light rays 4 from the microprojector 8 travel through waveguide 13 and are reflected from the partial reflectors 3 to a user's eye 2.

The transition from the information state to the transparent state in the switchable viewing area 11 is made gradually and in a variety of ways, according to various embodiments of the present invention. In one embodiment, the image information displayed on the switchable viewing area 11 is moved to pan across the switchable viewing area 11 and portions of the switchable viewing area are progressively switched from the information state to the transparent state until the image information is no longer displayed in the switchable viewing area (e.g. as shown in FIGS. 6A-6E).

In other embodiments of the present invention, the transition of portions of the switchable viewing area from the information state to the transparent state is made by fading from one state to the other or by an instantaneous switch. A gradual transition is made by applying an analog control signal of increasing or decreasing value, for example by applying an increasingly strong electric field. Alternatively, a gradual transition is made by applying a digital control signal, for example by using time-division multiplexing between a transparent state and an information state in which the switchable viewing area is substantially opaque.

When in the information state, the switchable viewing area 11 is opaque or reflective, so that ambient light does not interfere with projected light rays carrying image information to the user's eye. When in the transparent state, the lens area need not be completely transparent. The entire lens area is partially darkened to reduce the perceived brightness of the ambient environment similar to sunglasses. In cases where the ambient environment is dark or where the lens area is partially darkened, the see-through image of the ambient environment is substantially less bright than the image information presented on the switchable viewing area. In one embodiment of the present invention, information is overlaid on the viewed real-world scene, for example, as is done in an augmented-reality system. The overlaid information is semi-transparent so that the real-world scene is viewed through the information. The overlaid information is presented on the switchable viewing area or on the region of the lens area that surrounds the switchable viewing area.

As will be readily appreciated, according to various embodiments of the present invention, the head-mounted display apparatus and the switchable viewing area can also be switched from a transparent state to an information state and then back to a transparent state. In other cases, the switched state is left active, according to the needs of the user.

Figure 8A:
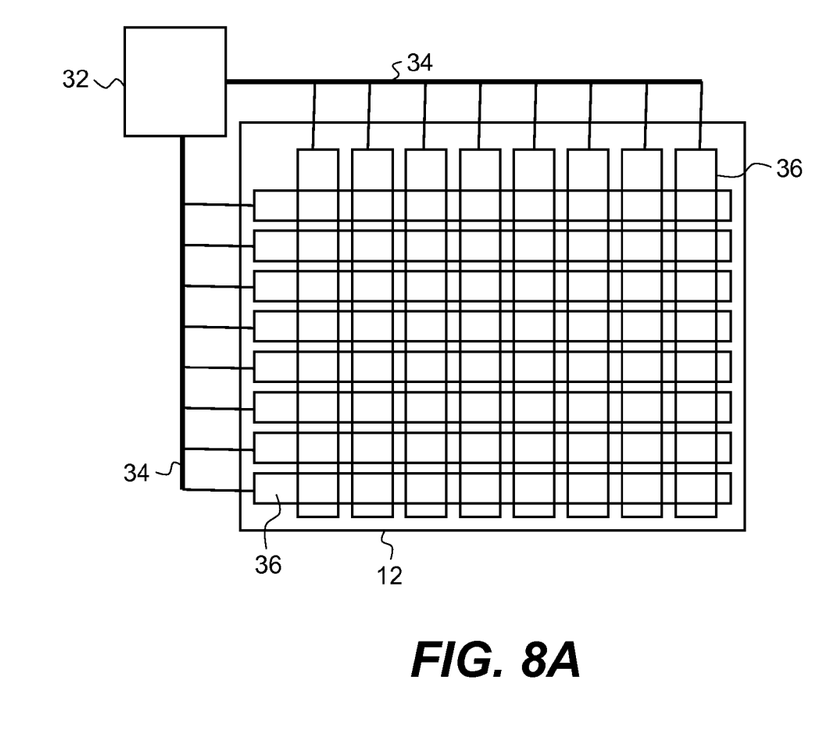
FIG. 8A is a schematic of a switchable viewing area with a two-dimensional array of independently controllable rectangles useful in an embodiment of the present invention.
Figure 8B:
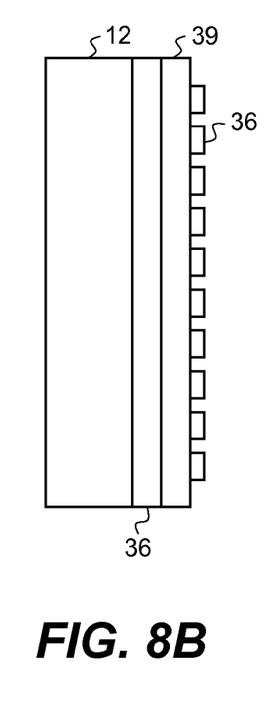
FIG. 8B is a cross section of a switchable viewing area with a two-dimensional array of independently controllable rectangles useful in an embodiment of the present invention.

In a further embodiment of the invention, the switchable viewing area 11 (FIG. 1) includes a matrixed array of independently controllable portions across the switchable viewing area 11 (FIG. 1). FIG. 8A shows a schematic diagram of a matrixed array of independently controllable portions within the switchable viewing area 11 (FIG. 1). In this embodiment of the invention, lens area 12 can comprise a glass element, but not necessarily flat. The switchable array of portions is comprised of two orthogonal one-dimensional arrays of transparent electrodes 36 formed on the glass with an electrically responsive material 39 (FIG. 8B) such as a liquid crystal pi cell layer, a polymer stabilized liquid crystal layer or an electrochromic layer located between each of the transparent electrodes 36 in the array. The electrodes transparent are controlled with a controller 32 (that can include a computer or control electronics) in a passive-matrix configuration as is well known in the display art. Alternatively, an active-matrix control method is used, as is also known in the display art (not shown). In either the active- or the passive-matrix control method, the transparent electrodes 36 are transparent, comprising for example, indium tin oxide or zinc oxide. The electrically responsive material 39 changes its optical state from a substantially opaque reflective or absorptive state to a transparent state in response to an applied electrical field provided by the controller 32 through the wires 34 to the transparent electrodes 36. Transparent electrodes 36 are known in the art (e.g. ITO or aluminum zinc oxide). Because each portion of a conventional passive-matrix controlled device in the switchable viewing area 11 is only switched for a part of a display cycle, light external to the display will be blocked for much of the time, resulting in a dim appearance of an external, real-world scene. Hence, an active-matrix control is preferred, especially if the control transistors are transparent and comprise, for example, doped zinc oxide semiconductor materials. FIG. 8B shows a schematic diagram of a cross-section of a switchable viewing area 11 with a matrixed array of independently switchable regions and associated electrodes 36 and the electrically responsive material 39.

The invention has been described in detail with particular reference to certain preferred embodiments thereof, but it will be understood that variations and modifications can be effected within the spirit and scope of the invention.

PARTS LIST 2 user's eye
3 partial reflectors
4 light rays passing from the microprojector
5 light rays from the ambient environment
7 variable occlusion member
8 microprojector or image source
9 control electronics
10 head-mounted display apparatus
11 switchable viewing area
12 lens area
13 waveguide
14 ear pieces
15 portion 16 portion
17 horizon
18 fixed grid
32 controller
33 rectangular regions
34 wires or buss
35 control wires
36 transparent electrodes
37 transparent electrode
38 transparent backplane electrode
39 electrically responsive material
62 real-world objects
100 provide HMD step
105 operate step
110 display information step
115 analyze information step
120 modify information step
125 modify operation step

The invention claimed is:

1. A method of identifying a motion-sickness problem in an image sequence, comprising:
providing a head-mounted display having a switchable viewing area that switches between a transparent and an opaque state;
using a processor to analyze the image-sequence information to identify a propensity that the image-sequence can induce motion sickness in a user and forming a saliency map calculated from salient static and dynamic visual features in the image sequence information, wherein the static and dynamic visual features are moving and static objects;
identifying moving and static objects and parameters in the saliency map describing the characteristics of the moving and static objects and the distribution of salient static and dynamic visual features in the saliency map that can induce motion sickness;
determining the propensity of the identified moving and static objects and parameters in the saliency map to induce motion sickness;
producing a signal based upon the determined propensity to induce motion-sickness; and
modifying the transparency of the switchable viewing area in response to the signal.

2. The method of claim 1, further including the step of estimating the illusion of self-motion in the image-sequence information that is produced in a viewer that can induce motion sickness.

3. The method of claim 1, further including the step of using the signal to identify that the image-sequence information has a propensity to induce motion sickness to the user.

4. The method of claim 1, further including using the signal to automatically modify the image-sequence information to reduce the propensity of the image-sequence information to induce motion sickness.

5. The method of claim 4, further including the step of estimating the illusion of self-motion in the image-sequence information that is produced in a viewer that can induce motion sickness.

6. The method of claim 4, wherein the modification includes increasing the transparency of the image-sequence information.

7. The method of claim 4, wherein the modification includes decreasing the similitude of the image-sequence information to a real-world scene.

8. The method of claim 7, wherein the modification includes changing the sharpness of the image-sequence information, adding noise to or subtracting noise from the image-sequence information, increasing or decreasing the pixelation of the image-sequence information, or changing the brightness, color saturation, or contrast of the image-sequence information.

9. The method of claim 4, wherein the modification includes adding additional information to the image-sequence information.

10. The method of claim 9, wherein the modification includes providing an artificial or actual horizon in the image-sequence information.

11. The method of claim 9, wherein the modification includes providing a fixed grid in the image-sequence information.

12. The method of claim 4, wherein the modification includes providing a stable audio tone or a steady and localized tactile sensation.

13. The method of claim 4, wherein the modification is a function of the user exposure duration.

14. The method of claim 4, wherein the user has user attributes and the modification is a function of the user attributes.

15. The method of claim 14, wherein the user attributes include age, gender, race, and individual susceptibility to motion sickness or motion sickness symptoms.

* * * * *